United States Patent [19]
Wohrl

[11] 4,387,778
[45] Jun. 14, 1983

[54] FLUID WEIGHING DEVICE AND METHOD FOR ITS CALLIBRATION AND TESTING

[76] Inventor: Josef Wohrl, 7114 Pfedelbach, Stuttgart, Fed. Rep. of Germany

[21] Appl. No.: 298,276

[22] Filed: Aug. 31, 1981

[30] Foreign Application Priority Data

Feb. 25, 1981 [GB] United Kingdom ............... 8105957

[51] Int. Cl.³ .................. G01G 5/02; G01G 19/52; G01L 25/00; G01F 23/06
[52] U.S. Cl. ............................... 177/207; 177/50; 73/1 B; 73/1 H; 73/309
[58] Field of Search ............ 177/207, 50; 73/1 B, 73/1 H, 309

[56] References Cited

U.S. PATENT DOCUMENTS

| | | | |
|---|---|---|---|
| 1,237,478 | 8/1917 | Clift | 73/309 |
| 3,677,356 | 7/1972 | Goodwin | 177/207 X |
| 4,216,886 | 8/1980 | Puschalovsky et al. | 177/207 X |
| 4,244,211 | 1/1981 | Carpino | 73/309 X |
| 4,244,218 | 1/1981 | Wohrl | 73/309 |

Primary Examiner—George H. Miller, Jr.
Attorney, Agent, or Firm—Holman & Stern

[57] ABSTRACT

A fluid measuring device comprises a plunger positioned within a tank containing fluid to be weighed by a load measuring cell and weight indicator. The weight of the plunger exceeds the maximum fluid upthrust exerted on it, and the net weight is transmitted to the load measuring cell and weight indicator through levers. At any fluid level there is a constant ratio between the horizontal cross-sectional areas of the plunger and the tank, and the weight indicator multiplies the measured load by this factor and any leverage ratios not accounted for by the load measuring cell. Callibration and testing is achieved, without having to remove the plunger from the tank or having to manipulate the fluid contained in the tank, by operating a lifting means to raise the plunger sufficiently to disconnect a hook joint, by applying a compensating moment to the lever through the application of the weight, by adjusting a counterpoise weight, and by using callibration weights.

11 Claims, 2 Drawing Figures

FLUID WEIGHING DEVICE AND METHOD FOR ITS CALLIBRATION AND TESTING

The present invention relates to a fluid weighing device for measuring and indicating the weight of fluid in a tank, and also to a method for calibrating and testing such device.

BACKGROUND OF THE INVENTION

From German Pat. No. 288041 and U.S. Pat. No. 3,677,356 it is known for such a fluid weighing device to measure the fluid upthrust on a plunger held in a tank, and also to display the weight of fluid at any level as the mathematical product of the upthrust and the ratio of the horizontal cross-sectional areas of the tank and the plunger.

Our U.S. Pat. No. 4,244,218 teaches a fluid measuring device which utilises a gyroscopic dynamometer cell and provides a digital readout of weight or volume to an exceptionally high degree of accuracy. This system is particularly attractive as the readings are taken rapidly with a full digital interface to ancillary equipment, and is insensitive to vibration and to temperature fluctuations. The upthrust from the plunger is applied to the gyroscopic load cell through a single lever which is pivoted about a fulcrum and carries a tare weight to counterbalance the full weight of the plunger. A very fine length adjuster is positioned between the plunger and the lever to ensure that the top face of the plunger can be adjusted precisely to the maximum liquid level in the tank. The callibration of the device is also described in some detail.

In our U.S. patent application Ser. No. 165,699 (continuation of application Ser. No. 22,182) we describe the manner in which the contents of particularly large liquid storage tanks can be measured using a modified fluid measuring device, and its callibration is also described in detail.

The principal method of callibration we have described in these previous Patents necessitates filling the tank with fluid, and then progressively removing the fluid in discrete steps, the fluid removed at each step being carefully collected and weighed on a second balance, and its weight being compared with the change in the weight indicated by the fluid weighing device. In several industries, for instance the chemical and petroleum industries, very large tanks are now commonly used and typically have capacities in excess of one million liters. With such large tanks, this method of callibration is impracticable as it would both necessitate having a spare tank available for receiving the fluid removed during callibration, and would involve making a very large number of callibration measurements.

It would also be conceivable to callibrate a fluid measuring device by first removing the plunger from the tank so that it is not subjected to any fluid upthrust and is counterbalanced by the tare weight. However the large tanks currently favoured by industry would require a plunger length of at least 10 meters and sometimes 20 meters or more, and it would be totally impracticable to install a fluid measuring device which could only be callibrated by incurring the very considerable time and expense of extracting such a long and heavy plunger.

OBJECT OF THE INVENTION

It is an object of this invention to enable a fluid measuring device to be callibrated and tested in a manner which will avoid these disadvantages.

BRIEF SUMMARY OF THE INVENTION

The present invention more specifically relates to a fluid weighing device comprising:

a tank for receiving the fluid to be weighed;

a plunger positioned within the tank and extending between minimum and maximum fluid weighing levels, the horizontal cross-sectional area of the plunger at any intermediate fluid level being a constant ratio to the horizontal cross-sectional area of the tank at that level, and the weight of the plunger being greater than the weight of displaced fluid at the maximum weighing level;

a load measuring cell;

an adjustable counterpoise weight;

a lever means interconnecting the plunger, the load measuring cell and the counterpoise weight such that, when the fluid is at the maximum weighing level, the counterpoise weight will exert a moment on the lever means which will be equal but opposite to the moment exerted by the plunger, and the load measuring cell will be under zero load;

the load measuring cell being adjusted so that the application of zero load will produce a signal equivalent to the fluid upthrust on the plunger when the fluid is at the maximum weighing level, and so that the load applied to the load measuring cell when the fluid is at a lower level will produce a signal equivalent to the fluid upthrust on the plunger at that fluid level;

a weight indicator operated by the load measuring cell and programmed to take account of the constant ratio so that the true weight of the fluid above the minimum weighing level will be indicated;

means for disconnecting the plunger from the lever means during callibration or testing of the fluid weighing device;

a weight for connection to a predetermined position on the lever means after the disconnection of the plunger, the weight and predetermined position being such that a moment will be applied to the lever means which will be equal to the moment which would be applied by the plunger when the fluid is at the maximum weighing level, and a series of callibrated weights for sequential attachment to a predetermined attachment position on the lever means after disconnection of the plunger and connection of the weight, the callibrated weights and their attachment position being such that they will apply respective test moments to the lever means corresponding with predetermined fluid levels.

The load measuring cell may be a dynamometer cell, but is preferably a gyroscopic dynamometer cell.

The plunger is preferably positioned vertically within the tank and has a constant horizontal cross-sectional area between the maximum and minimum weighing levels.

The lever means may be a single lever pivoted about a fulcrum, the adjustable counterpoise weight being carried by the lever on one side of the fulcrum, and the plunger and the load measuring cell being connected to the lever on the other side of the fulcrum. The plunger is preferably connected to the lever through an auxiliary lever means.

The means for disconnecting the plunger preferably includes a lost motion device arranged operatively between the plunger and the lever means. A lifting means may be provided for raising the plunger from its normal position to actuate the lost motion device.

A lifting means may be provided to lower the weight onto the lever means in the predetermined position.

A lifting means may be provided to lower each callibrated weight onto the lever means in the predetermined attachment position.

The present invention also relates more specifically to a method of callibrating and testing such a fluid weighing device including, operating the means for disconnecting the plunger from the lever means, applying the weight to the predetermined position on the lever means, adjusting the counterpoise weight if necessary until the weight indicator indicates the weight of fluid the tank can hold between the maximum and minimum weighing levels, attaching the callibrated weights sequentially to their predetermined attachment position on the lever means and adjusting the fluid measuring device as necessary to ensure that the weight indicator indicates the correct weight of fluid corresponding to each predetermined fluid level, then disconnecting the weight and the callibrated weights from the lever means, and reconnecting the plunger to the lever means.

BRIEF DESCRIPTION OF THE DRAWINGS

The invention is now described, by way of example only, with reference to the accompanying drawings, in which.

DETAILED DESCRIPTION OF THE INVENTION

Figure 1:
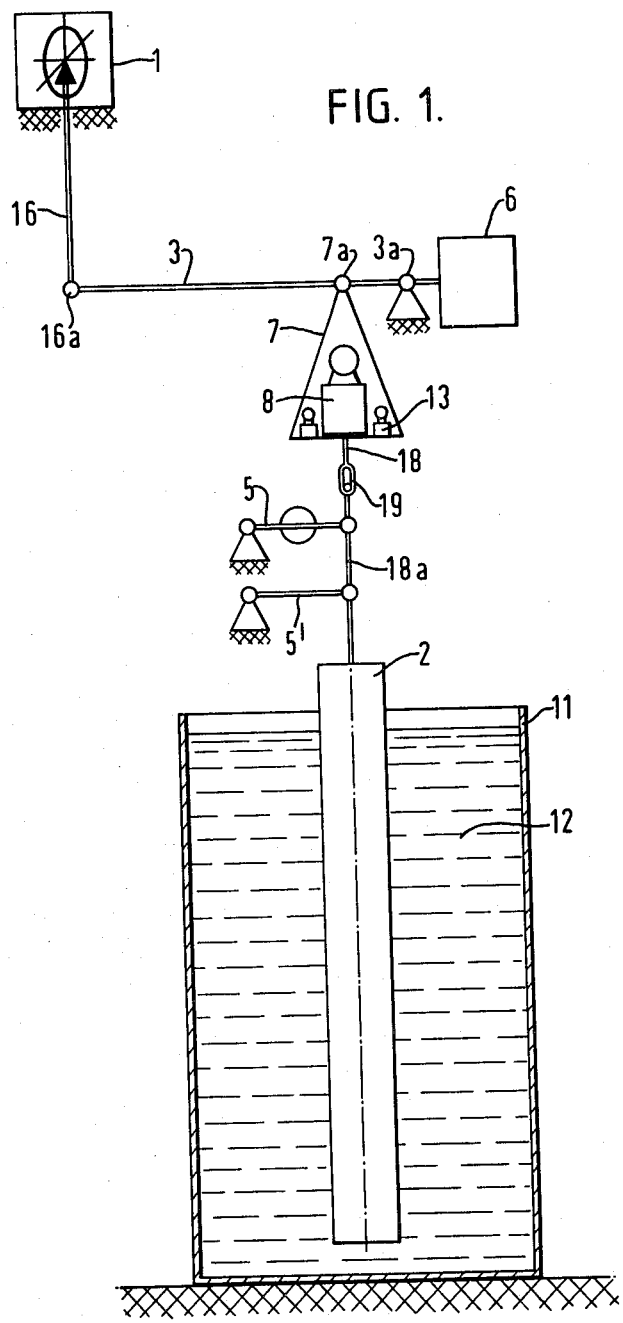
FIG. 1 is a side elevation of a simple embodiment of the invention, with the tank shown in section.

In FIG. 1, a lever means in the form of a single lever 3 is pivoted on a knife-edge 3a which is mounted from a fixed base, as shown, and serves as a fulcrum. One end of the lever 3 is connected by a flexure 16a and a load transmitting rod 16 to a load measuring and indicating device 1 which is also mounted from a fixed base. The device 1 is shown diagrammatically and includes a weight indicator operated by a load measuring cell. This load measuring cell is preferably a gyroscopic dynamometer cell, as this is the only dynamometer cell which is capable of measuring an applied force without relative movement of the applied force, and provides the greatest accuracy, digital output, quick measurement, and is unaffected by vibration or temperature variation. However, the present invention would also apply to fluid weighing devices using inferior dynamometer cells, in which there is slight relative movement of the applied load, such as pressure gauges. The present invention also applies to fluid weighing devices in which the load measuring cell is a balance cell having an invariably constant equilibrium or zero setting, such as a two-armed beam balance.

A plunger 2 is positioned vertically within a tank 11 which is mounted from the fixed base and contains the fluid 12. The plunger has a constant horizontal cross-sectional area between the maximum fluid weighing level illustrated, and a minimum fluid weighing level corresponding with the bottom of the plunger. The useful range of the fluid weighing device is optimised by positioning the bottom of the plunger as close as possible to the base of the tank. The tank 11 also has a constant horizontal cross-sectional area between these levels so that the horizontal cross-sectional area of the plunger at any intermediate fluid level is a constant ratio to the horizontal cross-sectional area of the tank at that level. As taught in our aforesaid earlier patent applications, this constant ratio can also be achieved when the tank has a varying cross-sectional area by appropriately shaping the plunger.

A rod 18a is rigidly secured to the plunger 2 and is connected by a pair of flexures to the one ends of a pair of parallel links 5 and 5' of which the other ends are mounted by flexures from the fixed base as shown. In this manner the plunger 2 is positively located in the tank, apart from a potential slight vertical freedom of movement. However, the weight of the plunger is chosen so that it is heavier than the weight of displaced fluid at the maximum weighing level, and its vertical position is controlled by the position of a releasable hook joint 19 between the rod 18a and a rod 18 which is secured to a pan 7 supported from the lever 3 by a knife-edge 7a. In the case where the load measuring cell is a gyroscopic dynamometer cell, the vertical position of the plunger 2 is always the same but, where some other kind of load measuring cell is employed, the vertical position of the plunger 2 will vary slightly during use of the fluid weighing device. The length of the plunger must be at least the same as the vertical distance between the maximum and minimum fluid weighing levels, and is preferably longer as shown so that it is not wholly immersed when the fluid is at its maximum weighing level.

An adjustable counterpoise weight 6 is carried by the other end of the lever 3 and has been designed so that it has substantially the same moment arm about the knife-edge 3a as the plunger 2. The weight of the counterpoise weight 6 is selected so that it is substantially equal to the difference between the weight of the plunger 2 and the fluid upthrust when the fluid is at the maximum weighing level. Thus, when the counterpoise weight 6 has been correctly adjusted and the fluid is at the maximum weighing level, the counterpoise weight 6 will exert a moment on the lever 3 which will be equal but opposite to the moment exerted by the plunger, and the load measuring cell 1 will be under zero load. However, the load measuring cell is adjusted so that the application of zero load will produce a signal equivalent to the fluid upthrust on the plunger 2 when the fluid is at the maximum weighing level, and so that the load applied to the load measuring cell when the fluid is at a lower level will produce a signal equivalent to the fluid upthrust on the plunger at that fluid level. Also the weight indicator is programmed to take account of the constant ratio so that the true weight of the fluid above the minimum weighing level will be indicated. If desired, the respective moment arms of the plunger 2 and the counterpoise weight 6 need not be the same, provided that the weight of the counterpoise weight 6 is appropriately adjusted to give the abovementioned equilibrium when the fluid is at the maximum weighing level.

The fluid weighing device is callibrated and/or tested by first moving the plunger 2 vertically relative to the rod 18 so that the hook joint 19 is released. This can be achieved by either lifting the plunger 2 slightly, or by correspondingly lowering the fixed base on which the load measuring cell and the knife-edge 3a are supported.

A weight 8 is then put on the pan 7, the weight being exactly equal to the known weight of the plunger 2 less the calculated upthrust exerted on it when the fluid is at the maximum weighing level. The position on the counterpoise weight 6 is then adjusted as necessary until the weight indicator indicates exactly the weight of fluid the tank can hold between the maximum and minimum weighing levels.

A series of callibrated weights 13, which preferably correspond to fractions (e.g. 1/10-10/10) of the calculated upthrust exerted on the plunger 2 when the fluid is at the maximum weighing level, are then applied sequentially to the pan 7. These callibrated wieghts exert respective test moments to the lever 3 corresponding with the associated fluid levels, and the load measuring cell 1 is either adjusted as necessary to ensure that the weight indicator indicates the correct weight of fluid corresponding to each simulated fluid level, or an appropriate callibration curve or chart is made.

The weight 8 and the callibration weights 13 may, if desired, be applied to any convenient predetermined position on the lever 3, for instance at the flexure 16a, provided the actual weights are appropriately adjusted to take account of the different moment arms.

After callibration or testing has been completed, the weight 8 and callibration weights 13 are removed, and then the plunger 2 is reconnected to the lever 3.

It will be noted that no really major structural alterations are necessary to carry out the invention, and that the callibration or testing can be carried out simply, quickly, and with extremely high accuracy, both before the device is installed in its tank, and at any time after its installation irrespective of the current fluid level in the tank.

The releasable hook joint 19 constitutes a means for disconnecting the plunger 2 from the lever 3 and may, if desired, be replaced by any other releasable joint.

Figure 2:
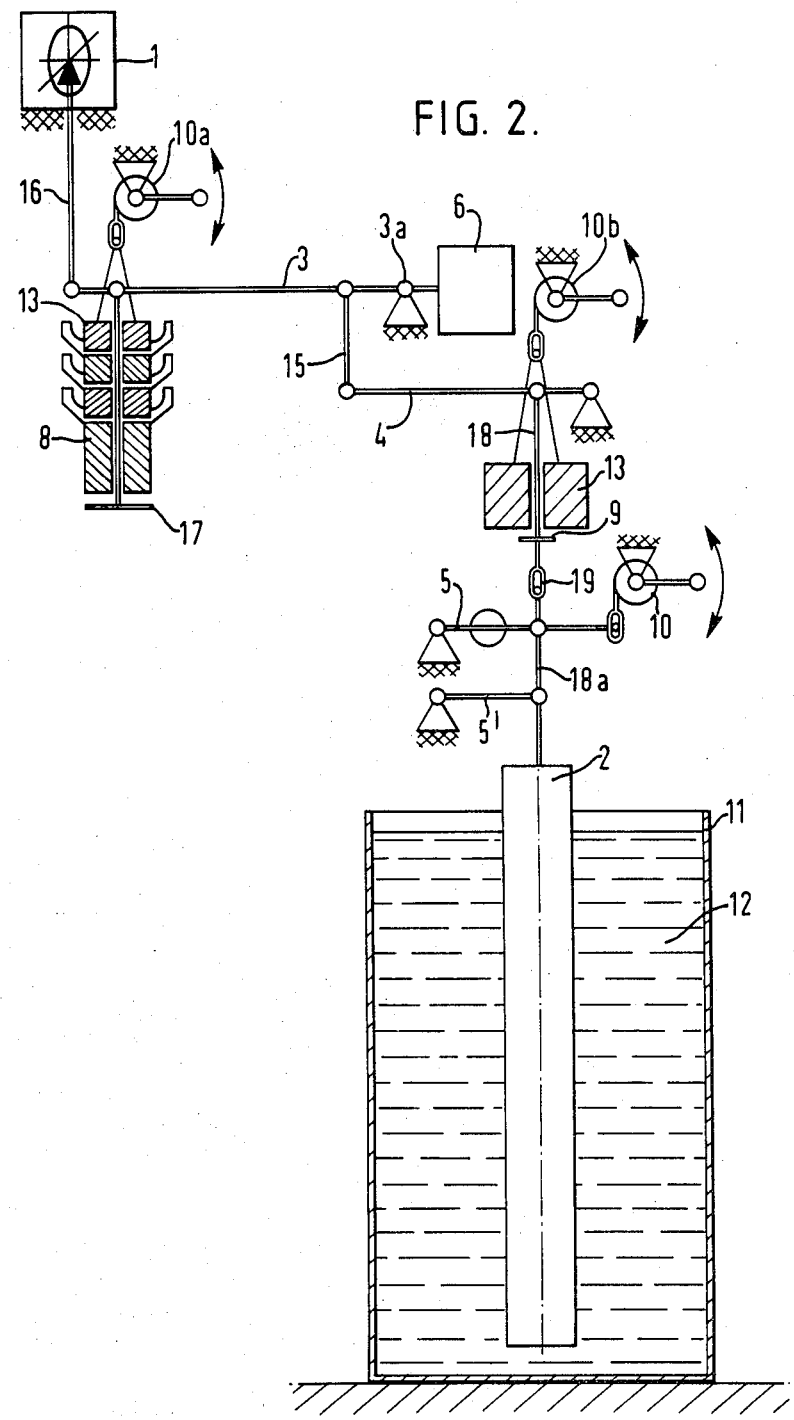
FIG. 2 is a side elevation of a preferred embodiment of the invention in which the tank is also shown in section.

In FIG. 2 the same reference numerals have been used to indicate equivalent components, and only the points of difference will be described.

The main point of difference is the provision of an auxiliary lever 4 of which the left end is connected through a pair of flexures and a link 15 to the lever 3, and the right end is pivoted by a flexure from the fixed base. The rod 18 is connected by another flexure to the lever 4 at a point much closer to the right end so that only a fraction of the forces applied to rod 18a by the plunger are transmitted to the lever 3. The pan 7 has been omitted and the weight 8 and callibration weights 13 are applied in a slightly different manner. Also lifting means 10, 10a and 10b are provided for use during callibration or testing. As illustrated, each of these lifting means comprises a flexible wire of which one end is connected to a lost motion device and the other end is connected to a wheel that is pivoted from the fixed base and is provided with an operating handle.

Callibration or testing is carried out in a similar manner to that described with reference to FIG. 1. First the lifting means 10 is operated to lift the extended end of the link 5, thereby releasing the hook joint 19 and disconnecting the plunger 2 from the lever 4 and consequently the lever 3.

Lifting device 10a is then operated to lower the weight 8 onto a pan 17 positioned at the bottom of a link which is connected by a flexure to the lever 3 near its connection to the load transmitting rod 16.

The counterpoise weight 6 is then adjusted, if necessary, until the weight indicator displays the calculated upthrust that would be exerted by the fluid when it is at its maximum weighing level.

Finally, the lever 3 is loaded with the callibration weights 13 in sequence until the whole operational range of the fluid measuring device has been checked. This is achieved by using the lifting device 10a to lift each of the callibration weights 13 that are near the weight 8, off its hooks and onto the pan 17 in the appropriate sequence, and/or by using the lifting device 10b to deposit one or more callibration weights 13 onto a pan 9 secured to the rod 18.

What is claimed is:

1. A fluid weighing device comprising:
   a tank for receiving the fluid to be weighed;
   a plunger positioned within the tank and extending between minimum and maximum fluid weighing levels, the horizontal cross-sectional area of the plunger at any intermediate fluid level being a constant ratio to the horizontal cross-sectional area of the tank at that level, and the weight of the plunger being greater than the weight of displaced fluid at the maximum weighing level;
   a load measuring cell;
   an adjustable counterpoise weight;
   a lever means interconnecting the plunger, the load measuring cell and the counterpoise weight such that, when the fluid is at the maximum weighing level, the counterpoise weight will exert a moment on the lever means which will be equal but opposite to the moment exerted by the plunger, and the load measuring cell will be under zeror load;
   the load measuring cell being adjusted so that the application of zero load will produce a signal equivalent to the fluid upthrust on the plunger when the fluid is at the maximum weighing level, and so that the load applied to the load measuring cell when the fluid is at a lower level will produce a signal equivalent to the fluid upthrust on the plunger at that fluid level;
   a weight indicator operated by the load measuring cell and programmed to take account of the constant ratio so that the true weight of the fluid above the minimum weighing level will be indicated;
   means for disconnecting the plunger from the lever means during callibration or testing of the fluid weighing device;
   a weight for connection to a predetermined position on the lever means after the disconnection of the plunger, the weight and predetermined position being such that a moment will be applied to the lever means which will be equal to the moment which would be applied by the plunger when the fluid is at the maximum weighing level, and
   a series of callibrated weights for sequential attachment to a predetermined attachment position on the lever means after disconnection of the plunger and connection of the weight, the callibrated weights and their attachment position being such that they will apply respective test moments to the lever means corresponding with predetermined fluid levels.

2. A method of callibrating the fluid weighing device claimed in claim 1, including operating the means for disconnecting the plunger from the lever means, applying the weight to the predetermined position on the lever means, adjusting the counterpoise weight if necessary until the weight indicator indicates the weight of fluid the tank can hold between the maximum and minimum weighing levels, attaching the callibrated weights sequentially to their predetermined attachment position on the lever means and adjusting the fluid measuring device as necessary to ensure that the weight indicator indicates the correct weight of fluid corresponding to each predetermined fluid level, then disconnecting the weight and the callibrated weights from the lever means, and reconnecting the plunger to the lever means.

3. A fluid weighing device, according to claim 1, in which the load measuring cell is a dynamometer cell.

4. A fluid weighing device, according to claim 1, in which the load measuring cell is a gyroscopic dynamometer cell.

5. A fluid weighing device, according to claim 1, 3 or 4, in which the plunger is positioned vertically within the tank and has a constant horizontal cross-sectional area between the maximum and minimum weighing levels.

6. A fluid weighing device, according to claim 1, 3 or 4, in which a lifting means is operable to lower the weight onto the lever means in the predetermined position.

7. A fluid weighing device, according to claim 1, 3 or 4, in which a lifting means is operable to lower each callibrated weight onto the lever means in the predetermined attachment position.

8. A fluid weighing device, according to claim 1, 3, or 4, in which the lever means is a single lever pivoted about a fulcrum, the adjustable counterpoise weight being carried by the lever on one side of the fulcrum, and the plunger and the load measuring cell being connected to the lever on the other side of the fulcrum.

9. A fluid weighing device, according to claim 8, in which the plunger is connected to the lever through an auxiliary lever means.

10. A fluid weighing device, according to claim 1, 3 or 4, in which the means for disconnecting the plunger includes a lost motion device arranged operatively between the plunger and the lever means.

11. A fluid weighing device, according to claim 10, in which a lifting means is operable to raise the plunger from its normal position to acturate the lost motion device.

* * * * *